Figure 1:
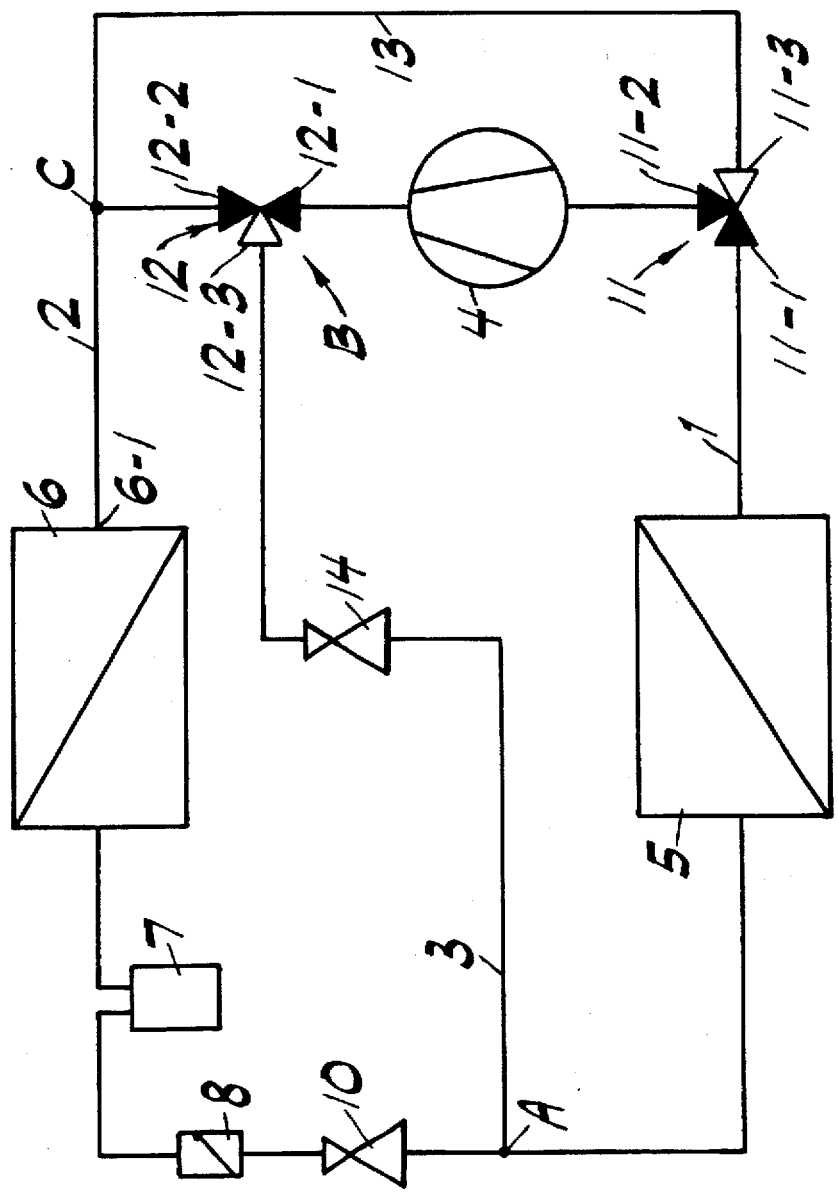

United States Patent [19]

Karl

[11] Patent Number: 5,737,930
[45] Date of Patent: Apr. 14, 1998

[54] AIR CONDITIONING FLUID CIRCUIT FOR A VEHICLE, GIVING ADJUSTABLE HEATING POWER

[75] Inventor: Stefan Karl, Paris, France

[73] Assignee: Valeo Climatisation, La Verriere, France

[21] Appl. No.: 620,388

[22] Filed: Mar. 22, 1996

[30] Foreign Application Priority Data

Mar. 22, 1995 [FR] France ................................. 95.03360

[51] Int. Cl.$^6$ .................................. F25B 5/00; F25B 41/00
[52] U.S. Cl. .......................... 62/117; 62/160; 62/324.4
[58] Field of Search .......................... 62/324.4, 196.4, 62/160, 174, 117

[56] References Cited

U.S. PATENT DOCUMENTS 4,790,142  12/1988  Beckey ................................. 62/160 X
5,291,941   3/1994  Enomoto et al. ...................... 165/62

FOREIGN PATENT DOCUMENTS 2624067  12/1988  France .
2717126   4/1995  France .

*Primary Examiner*—William E. Wayner
*Attorney, Agent, or Firm*—Morgan & Finnegan, L.L.P.

[57] ABSTRACT

In a heating mode, the fluid in the air conditioning circuit flows in a bypass branch avoiding the condenser. The evaporator then receives the fluid in the gaseous state and acts as a heat exchanger for dissipating the heat produced in the compressor. The heat dissipated by the evaporator may be employed to heat the cabin when that produced by the drive motor of the vehicle is insufficient. In addition, special configurations of the circuit enable the mass of fluid flowing in the heating loop to be increased or reduced with a view to regulating the calorific power produced.

9 Claims, 3 Drawing Sheets

AIR CONDITIONING FLUID CIRCUIT FOR A VEHICLE, GIVING ADJUSTABLE HEATING POWER

This invention relates to a method for modifying the temperature of a stream of air for delivery into the cabin of a vehicle, by heat exchange with an evaporator in which there flows a fluid which also passes into a compressor and into a flow restrictor, the said method including a cooling mode for the air stream in which the said fluid is caused to flow successively into the evaporator, into the compressor, into a condenser in which it gives up heat to another medium, and into a flow restrictor.

Such a method is conventionally used for air conditioning the cabin of a vehicle, especially a vehicle having a motor consisting of a heat engine or an electric motor. When air to be delivered into the cabin is to be heated, use is normally made of the heat produced by the motor, for example by causing the air stream to pass in contact with the heating radiator through which a coolant fluid for the motor passes.

When the motor is cold, it is not possible to draw on that heat for heating the cabin, and this delays the time when the latter reaches the desired temperature, and is therefore detrimental to the comfort of the occupants. In some cases, the coolant fluid never reaches, during its circulation, a temperature which is high enough to give a comfortable temperature in the cabin.

In order to accelerate the bringing of the cabin to the required temperature, it is possible to make use of additional devices, especially those comprising burners or electric radiators, which involves high first cost.

The object of the invention is to enable the cabin to be heated rapidly when the motor is cold, or to make sufficient the insufficient quantity of heat which it gives off, without having recourse to costly specific devices for this purpose, and with adjustment of the calorific power to demand.

The invention is directed, in particular, to a method of the kind defined in the introduction hereof, and provides that it includes a heating mode for the air stream, in which the fluid leaving the compressor is delivered to the evaporator without passing through a condenser, and in that fluid is removed from or added to the evaporator in such a way as to regulate the mass of fluid passing through the evaporator in the heating mode, and consequently the calorific power produced.

The heating mode which can be employed for heating the cabin, especially when the motor is cold, thus makes use of the existing air conditioning installation with minor modifications.

However, the calorific power produced in the heating mode is determined by the mass flow produced by the compressor, which is itself a function of its driving speed and consequently of the prevailing running mode of the motor. This power may be greater or less than that which is required for heating the cabin. The invention enables the reserve of fluid in the liquid state contained in the condenser to be used for increasing the quantity of fluid flowing in the heating mode, in such a way as to increase the mass flow and the calorific power at a given speed of the compressor, and/or to return excess fluid into the condenser so as to reduce this mass flow and power. In particular, in the event of starting at low temperature, the initial density of the fluid in the air conditioning circuit, and consequently the mass flow produced by the compressor, are insufficient to ensure satisfactory heating. This drawback is reduced by the aspiration of additional fluid from the condenser.

Further features, complementary or alternative, of the invention are set forth below:

- the compressor and the condenser are connected together momentarily in order to extract fluid from, or to introduce fluid into, the latter.
- the fluid flows through different flow restrictors in the two modes.
- the evaporator works as an evaporator in the cooling mode, and works only as a heat exchanger in the heating mode.
- the vehicle has a drive motor which gives off heat in operation, and which makes use of the heating mode for heating the cabin during periods of time in which the heat supplied by the motor is insufficient for that purpose.

The invention is also directed to an air conditioning apparatus for the cabin of a motor vehicle, comprising a fluid circuit which includes a cooling loop comprising a first branch containing an evaporator, followed by a compressor, and a second branch containing a condenser, the cooling loop also containing a first flow restrictor interposed between the condenser and the evaporator, and means for delivering into the cabin air which has undergone heat exchange with the evaporator.

The apparatus in accordance with the invention further includes a third branch containing no condenser and arranged in parallel with the second branch, in such a way as to constitute, with the first branch, a heating loop, together with changeover means for controlling the flow of fluid either into the cooling loop or into the heating loop, or into a fluid charging path in which the condenser is connected directly to the inlet of the compressor, or, in another version, into a fluid discharge loop, in which the condenser is connected directly to the outlet of the compressor.

The apparatus according to the invention may have at least some of the following features:

- in the fluid charging path and, if necessary, in the fluid discharge loop, the condenser is connected to the compressor through its fluid inlet in the cooling loop.
- the fluid discharge loop is also the cooling loop.
- the changeover means include a first three-way valve interposed in the first branch and connected through first and second ports to the outlet of the evaporator and to the inlet of the compressor respectively, a second three-way valve which is connected through its first, second and third ports to the downstream, upstream and upstream ends of the first, second and third branches respectively, with a fourth circuit branch connecting the third port of the first valve to the upstream end of the second branch, and coordinated control means for the two valves for putting into communication with each other, either the first and second ports of the first valve and the first and second ports of the second valve so as to establish the cooling and fluid discharge loop, or the first and second ports of the first valve and the first and third ports of the second valve so as to establish the heating loop, or the second and third ports of the first valve and the first and third ports of the second valve so as to establish the fluid charging path.
- the first flow restrictor is in the second branch, and a second flow restrictor is arranged in the secondary loop.
- the second flow restrictor is arranged in the third branch.

Figure 2:
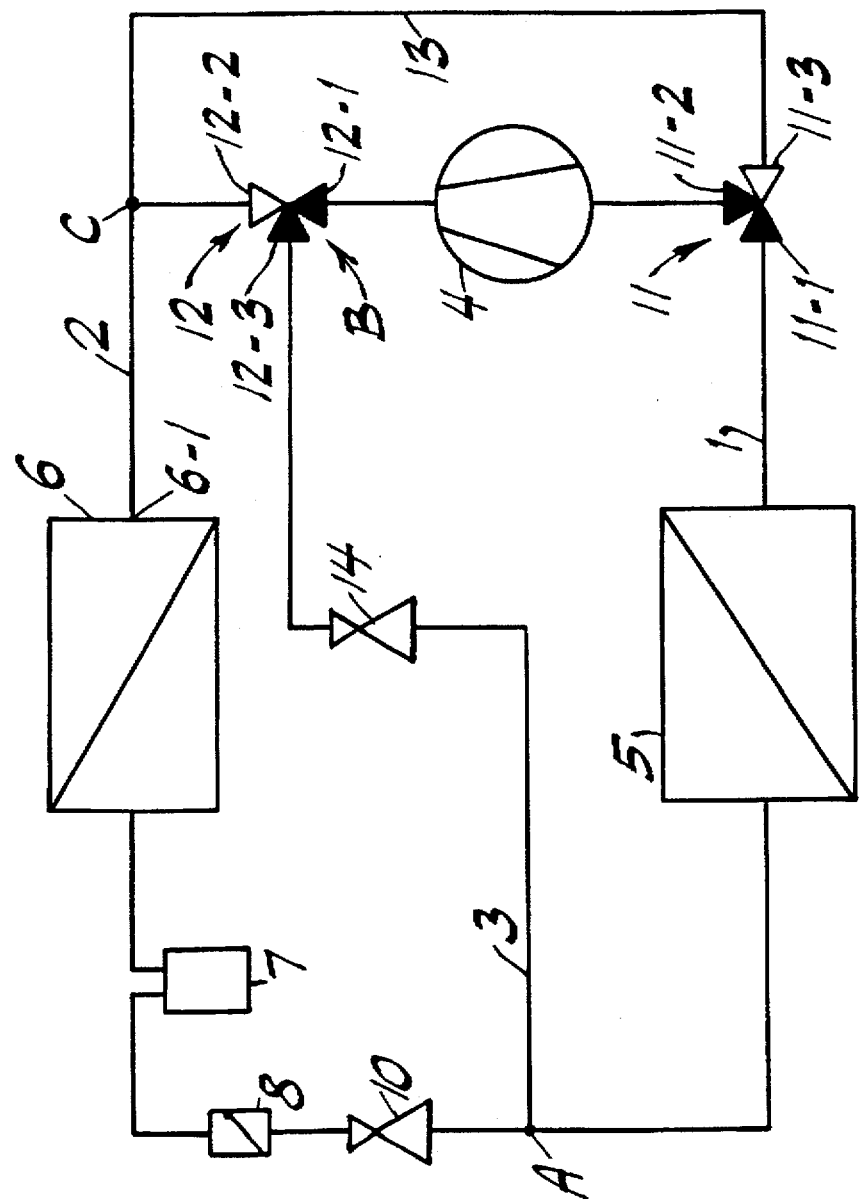
Figure 3:
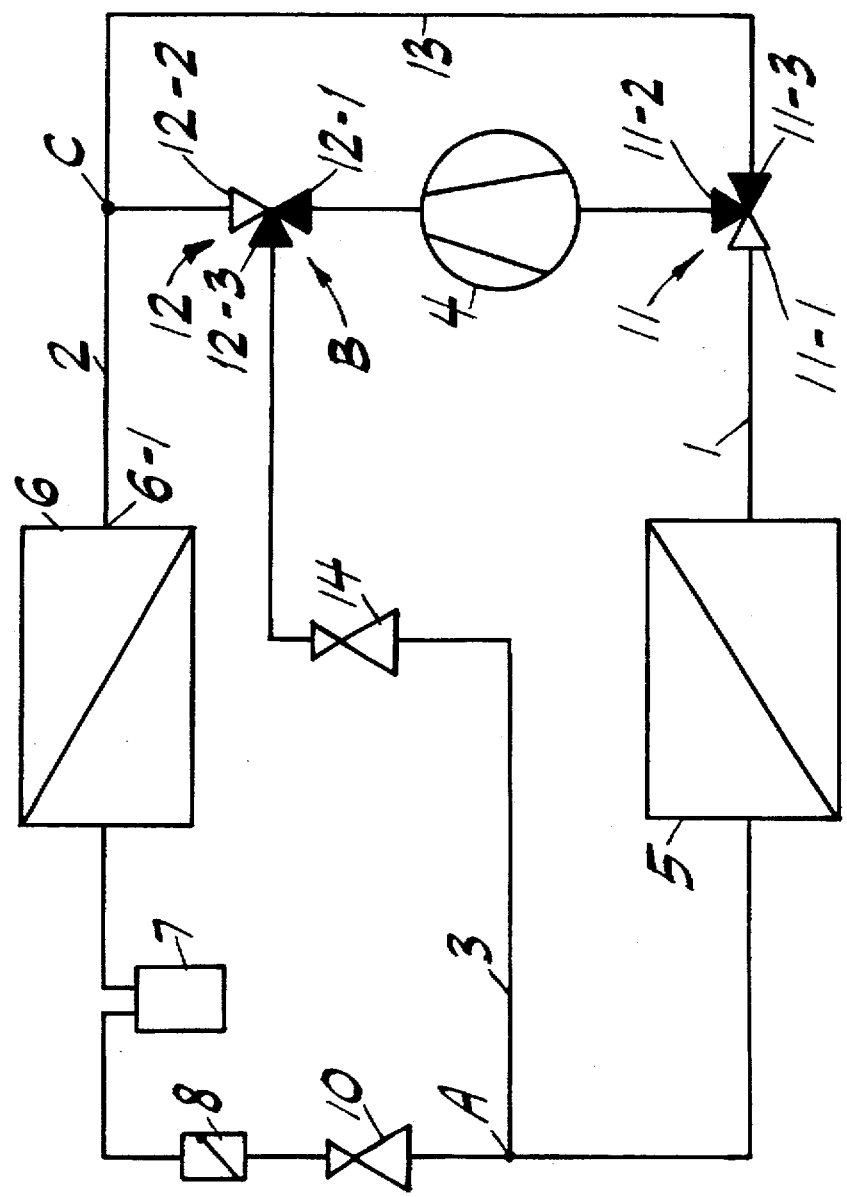

The features and advantages of the invention will be disclosed in greater detail in the following description, with reference to the attached drawings, in which FIGS. 1 to 3 are diagrams for the fluid circuit of an apparatus in accordance with the invention for air conditioning and heating the cabin of a vehicle, in its various operating modes.

In this circuit, there flows a fluid which is such as to pass from the liquid phase to the gaseous phase with absorption of heat, and from the gaseous phase to the liquid phase while giving up heat, as is commonly the case in air conditioning installations for vehicles. The components of the circuit are also commonly found in those air conditioning installations.

The components of the circuit shown are distributed among three branches 1, 2 and 3, which are joined together at two junction points A and B. The branch 1 contains a compressor 4 which causes a fluid to circulate therein from the point A towards the point B, and an evaporator 5 which is arranged upstream of the compressor. The branch 2 contains, from the point B towards the point A, a condenser 6, a receiver bottle 7, a non-return valve 8 and a flow restrictor 10. A second flow restrictor 14 is arranged in the branch 3. A first three-way valve 11 is interposed in the branch 1, in such a way that two of its three ports 11-1 and 11-2 communnicate respectively with the outlet of the evaporator 5 and with the inlet of the compressor 4. A second three-way valve 12 is arranged at the junction point B in such a way that its three ports 12-1, 12-2 and 12-3 are connected respectively to the downstream end of the first branch, that is to say to the outlet of the compressor 4, to the upstream end of the second branch, that is to say to the inlet of the condenser 6, and to the upstream end of the third branch, that is to say to the inlet of the flow restrictor 14. Finally, a fourth branch 13, which does not contain any component of the circuit, connects the third port 11-3 of the electrically operated valve 11 to an intermediate point C in the branch 2, lying between the port 12-2 and the condenser 6.

The electric valves 11 and 12 are controlled in coordination with each other, in such a way as to obtain the three configurations shown. In that of FIG. 1, each of these two valves puts its ports indicated by the reference numerals 1 and 2 into communication as indicated by the two black triangles. The fluid then flows in a closed loop constituted by the branches 1 and 2, with the branch 3 and the branch 13 being isolated by the valves 12 and 11 respectively. This loop operates like a conventional air conditioning circuit, with the fluid passing from the liquid phase to the gaseous phase in the evaporator 5, absorbing heat; and from the gaseous phase to the liquid phase in the condenser 6, giving up heat. The heat absorbed in the evaporator 5 can be taken directly or indirectly into a stream of air for delivery into the cabin of the vehicle.

In the configuration of FIG. 2, the valve 11 again puts its ports 1 and 2 into communication with each other, but this time, the valve 12 puts its ports 1 and 3 into communication with each other. The fluid therefore flows in a closed loop, constituted by the branches 1 and 3, with the branch 2 and the branch 13 being isolated by the valves 12 and 11 respectively. The fluid then passes through the compressor 4, the evaporator 5 and the restrictor 14. Since it no longer passes through the condenser, it remains in the gaseous state at all times. The evaporator 5 no longer acts as an evaporator, but continues to act as a heat exchanger, so enabling a major part of the heat produced by the compression of the fluid in the compressor 4 to be dissipated, and this heat can be used for heating the cabin when the heat engine of the vehicle is cold. In particular, since the circulating fluid is at a temperature greater than ambient temperature, a stream of air to be delivered into the cabin can be heated directly by contact in the evaporator.

In the configuration shown in FIG. 3, the valves put into communication with each other, firstly the ports 11-3 and 11-2, and secondly the ports 12-1 and 12-3. The inlet of the compressor is thus connected through the branch 13 to the normal inlet 6-1 of the condenser 6, from which fluid can be extracted in the gaseous state. This fluid subsequently flows into the branch 3, but is unable to return to the condenser from the point A, in particular because of the presence of the non-return valve 8. The fluid thus passes into the evaporator 5, where it accumulates since the valve 11 prevents communication between the outlet of the latter and the inlet of the compressor. The mass of fluid which will flow in the branches 1 and 3 after the configuration shown in FIG. 2 has been re-established is thus augmented.

Conversely, the configuration of FIG. 1 can be established momentarily, in order to enable the compressor to return the fluid into the condenser, thus reducing the mass of fluid in circulation after the system has returned to the configuration of FIG. 2.

The three-way valves may be controlled by any known control device for maintaining constant, or for causing the vary, the mass of fluid flowing in the evaporator in the heating mode.

In addition, the choice of the instants at which the changeover from one configuration to another is carried out is not a part of the invention. By way of example, during starting of the installation, the configuration of FIG. 3 may be set up if the outside temperature is below a threshold, which may depend on the demand for heat expressed by the occupants, so as to compensate, by an addition of fluid, for the insufficient pressure of the latter which results from the low temperature. The configuration of FIG. 2 is established at the end of a predetermined time interval, or immediately if the outside temperature is greater than the threshold mentioned above. It is then possible, for example, to monitor the temperature of the air heated by the evaporator 5, and if necessary by a heating radiator arranged downstream of the latter in the path of the air, and to use the control of the valves 11 and 12 in order to regulate this temperature.

In a modification of the method in accordance with the invention, in order to reduce the calorific power produced by the apparatus, instead of the fluid being delivered into the condenser, the compressor is at least partly uncoupled from the motor of the vehicle in order to reduce, or to eliminate momentarily, its speed of rotation.

The three-way valves may be electrically operated valves or manually operated valves, and may be hydraulic, pneumatic or otherwise.

I claim:

1. An air conditioning apparatus for the cabin of a motor vehicle, comprising a fluid circuit which includes a cooling loop comprising a first branch containing an evaporator, followed by a compressor, and a second branch containing a condenser, the cooling loop also containing a first flow restrictor interposed between the condenser and the evaporator, and means for delivering into the cabin air which has undergone heat exchange with the evaporator, characterised in that it further includes a third branch containing no condenser and arranged in parallel with the second branch, in such a way as to constitute, with the first branch, a heating loop, together with changeover means for controlling the flow of fluid either into the cooling loop or into the heating loop, or into a fluid charging path in which the condenser is connected directly to the inlet of the compressor.

2. Apparatus according to claim 1, characterised in that the changeover means are adapted so as also to control the flow of fluid into a fluid discharge loop, in which the condenser is connected directly to the outlet of the compressor.

3. Apparatus according to claim 2, characterised in that, in the fluid charging path and, if necessary, in the fluid discharge loop, the condenser is connected to the compressor through its fluid inlet in the cooling loop.

4. Apparatus according to claim 1, characterised in that, in the fluid charging path and, if necessary, in the fluid discharge loop, the condenser is connected to the compressor through its fluid inlet in the cooling loop.

5. Apparatus according to claim 4, characterised in that the fluid discharge loop is also the cooling loop.

6. Apparatus according to claim 5, characterised in that the changeover means include a first three-way valve interposed in the first branch and connected through first and second ports to the outlet of the evaporator and to the inlet of the compressor respectively, a second three-way valve which is connected through its first, second and third ports to the downstream, upstream and upstream ends of the first, second and third branches respectively, with a fourth circuit branch connecting the third port of the first valve to the upstream end of the second branch, and coordinated control means for the two valves for putting into communication with each other, either the first and second ports of the first valve and the first and second ports of the second valve so as to establish the cooling and fluid discharge loop, or the first and second ports of the first valve and the first and third ports of the second valve so as to establish the heating loop, or the second and third ports of the first valve and the first and third ports of the second valve so as to establish the fluid charging path.

7. Apparatus according to claim 6, characterised in that the first flow restrictor is in the second branch, and in that a second flow restrictor is arranged in the secondary loop.

8. Apparatus according to claim 6, characterised in that the first flow restrictor is in the second branch, and in that a second flow restrictor is arranged in the secondary loop.

9. Apparatus according to claim 8, characterised in that the second flow restrictor is arranged in the third branch.

\* \* \* \* \*